May 26, 1964

M. WALTON 3,134,292

IRRETRIEVABLE SCREW

Filed Dec. 20, 1962

INVENTOR.

Marvin Walton

BY

United States Patent Office 3,134,292
Patented May 26, 1964

3,134,292
IRRETRIEVABLE SCREW
Marvin Walton, 134 Tuscaloosa Ave., Atherton, Calif.
Filed Dec. 20, 1962, Ser. No. 246,255
2 Claims. (Cl. 85—45)

The present invention relates to screws.

In the assembly of apparatus from its components, screws are frequently employed as means for securing the components to each other, or for enclosing an assembled apparatus in a container. Similarly, screws are frequently employed as means for fastening apparatus or their containers to a place of use. It is often desirable to make it impossible for such apparatus to be disassembled or removed from their place of use by unauthorized or incompetent persons, to prevent theft, preclude incompetent handling of, or tampering with the apparatus, or to protect laymen from danger to themselves incurred in attempting to repair mechanisms that have become defective.

It is an object of my invention to provide a screw that cannot be withdrawn once it has been driven into position.

More particularly it is an object of my invention to provide a screw that may readily be turned in the proper direction to drive it into position, but which cannot be turned in the opposite direction.

Still another object of the invention is to provide a screw with a head that may readily be engaged by screw driving means for driving the screw into position but which is effective to disengage the screw driving means whenever said means is applied to it in the reverse direction.

These and other objects of the present invention will be apparent from the following description of the accompanying drawing which illustrates a preferred embodiment thereof and wherein FIGURE 1 is a perspective of a screw embodying my invention and shows above the head of the screw a fragmentary perspective of the tool required for driving it;

In accordance with my invention I provide a screw with a rounded head of elliptic contour and along the narrow sides of said head I provide excisions which form abutment surfaces, for engagement by the drive elements of a screw driving tool, that are disposed in a vertical plane containing the major axis of the elliptic circumference of the screw head, and which face in the direction opposite to the slope of the helical rib or thread on the screw stem; and in the direction away from said abutment surfaces, said excisions are arranged to form horizontally disposed arcuate escape ramps for the drive members of the screw driver tool. Hence, when the drive elements of a screw driving tool are brought into engagement with the excisions in the head of the screw and the tool is turned in the direction in which the thread on the screw stem slopes toward the pointed end thereof, the drive elements of the tool engage the abutment surfaces of said excisions effectively and drive the screw positively in the proper direction to cause it to penetrate into an aperture. On the other hand, when the tool is turned in the opposite direction, its driving members pass along the arcuate escape ramps from engagement with the screw head without affecting the rotary position of the screw. Hence, once the screw of the invention has been driven into position in an aperture, it is impossible to withdraw it with the normally available screw driving means.

Figure 1:
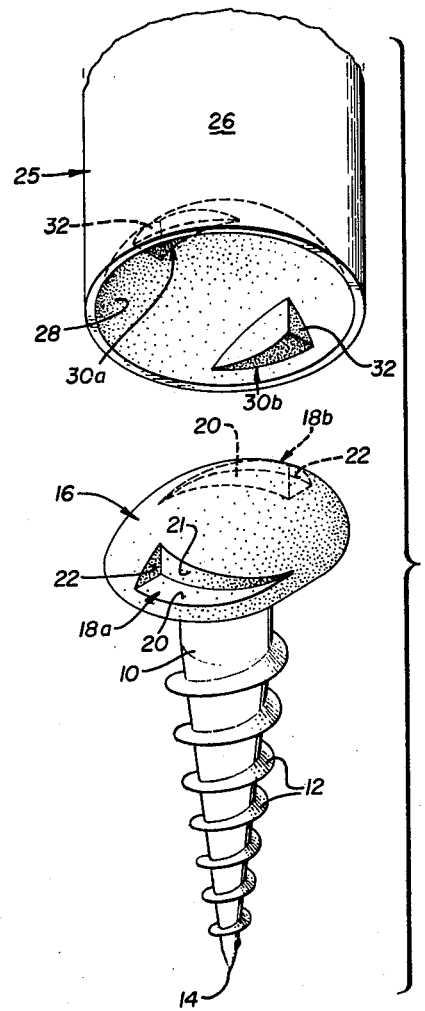
Figure 2:
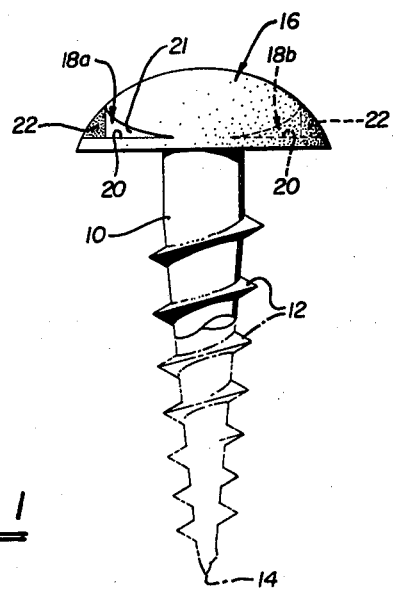
FIGURE 2 is a fragmentary side elevation of the screw shown in FIGURE 1.
Figure 3:
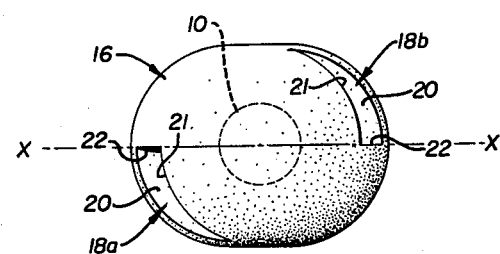
FIGURE 3 is a plan view of the screw.

Having reference to FIGURE 1, the screw of my invention comprises a stem 10 of a suitable metal that is provided with a helical rib or thread 12 which descends towards the point 14 of the stem in a clockwise direction as viewed from the top of the screw. The stem carries a rounded head or cap 16 which has an elliptic contour as shown in FIGURE 3. Provided in the top surface of the head along the narrow sides thereof are two excisions 18a and 18b respectively. Said excisions form at their clockwise ends abutment surfaces 22 that are disposed in a vertical plane which contains the major axis x—x of the elliptic contours of the screw head. Said abutment surfaces face in a direction opposite to the slope of the screw thread 12. In a direction away from said abutment surfaces, the excisions 18 have flat horizontally disposed floors 20 which have circular inner side walls 21 and thus form unobstructed arcuate escape ramps along which the drive members of a tool in engagement with said excisions may freely escape from engagement with the head of the screw when the tool is turned in a counterclockwise direction.

A suitable tool 25 for manipulating the described screw is shown in perspective above the head of the screw in FIGURE 1. It is made of hardened steel and comprises a cylindrical member 26 which may have the shape of a rod, and which has formed into its tip a concavity 28 that may be of a hemispherical conformation of a size to fit over the head 16 of the screw. Arranged along diametrically opposite areas of the concavity are arcuate ledges 30a and 30b which form at their clockwise ends vertical surfaces 32 that lie in planes extending radially of the concavity. In practical use the described tool is placed over the head of the screw and turned until the end surfaces 32 of its drive elements 30a and 30b come against the abutment surfaces 22 in the excisions 18a and 18b respectively of the screw head. Now when the tool is turned in clockwise direction, the end surfaces of the drive elements bear against the abutment surfaces and push the screw positively in the proper direction to drive it into the hole provided therefor. On the other hand, when the tool is turned in counterclockwise direction, the driving surfaces of its drive elements disengage themselves from the abutment areas of the excisions and said elements escape from the excisions upon the escape ramps 20 along the circular inner side walls 21 thereof. Counterclockwise rotation of the tool, therefore, remains without effect upon the rotary position of the screw, and the screw once driven home cannot be retrieved. Thus, articles secured into position with screws constructed in accordance with my invention, cannot be removed with ordinarily available screw driving tools, and containers having lids secured into position with the screws of my invention cannot be opened. Similarly, apparatus assembled from components that are secured to each other with the screws of my invention, cannot readily be disassembled. Hence, it is impossible for inexperienced or unauthorized persons to gain access to, and tamper with, instruments or disorganize delicate instrumentalities, and/or expose themselves to danger. As an added advantage, the screw of my invention lends itself exceptionally well to manipulation by high-speed power tools.

While I have explained my invention with the aid of an exemplary embodiment thereof, it will be understood that my invention is not limited to the specific constructional details shown and described by way of example which may be departed from without departing from the scope and spirit of my invention.

I claim:

1. An irretrievable screw comprising a stem, a rounded head of elliptic contour upon said stem and a thread on said stem descending helically to the bottom end thereof; said head having excisions along the narrow sides thereof forming abutment surfaces extending in a plane containing the major axis of the elliptic circumference of said head and the axis of said stem and facing in the direction opposite to the direction of descent of said thread, and adjacent to the bottom ends of said abutment surfaces arcuate escape ramps lying in a plane perpendicular to said stem, said excisions having circular inner side walls and said ramps and side walls extending to the external surface of said rounded head.

2. An irretrievable screw comprising a stem, a rounded head of elliptic contour upon said stem and a thread on said stem descending helically to the bottom end thereof; said head having excisions along the narrow sides thereof forming abutment surfaces lying in a plane containing the axis of said stem facing in the direction opposite to the direction of descent of said thread, and adjacent to the bottom ends of said abutment surfaces arcuate escape ramps lying in a plane perpendicular to said stem axis and having circular inner side walls, said ramps and said side walls extending to the external surface of said rounded head.

References Cited in the file of this patent

UNITED STATES PATENTS

| | | |
|---|---|---|
| 1,572,079 | Platt | Feb. 9, 1926 |
| 1,684,096 | Hughes | Sept. 11, 1928 |
| 1,956,963 | Salmen | May 1, 1934 |
| 2,042,267 | McCulloch | May 26, 1936 |

FOREIGN PATENTS

| | | |
|---|---|---|
| 138,281 | Great Britain | Feb. 5, 1920 |